United States Patent [19]

Warwick

[11] Patent Number: 5,206,489

[45] Date of Patent: Apr. 27, 1993

[54] MAGNETIC ENCODING DEVICE FOR CARDS

[75] Inventor: Dennis J. Warwick, Richfield, Minn.

[73] Assignee: Datacard Corporation, Minneapolis, Minn.

[21] Appl. No.: 929,465

[22] Filed: Aug. 13, 1992

Related U.S. Application Data

[63] Continuation of Ser. No. 312,738, Feb. 17, 1989, abandoned.

[51] Int. Cl.⁵ .............................................. G06K 7/08
[52] U.S. Cl. ................................... 235/449; 235/441; 235/485; 360/2
[58] Field of Search .................... 235/449, 441, 485; 360/2

[56] References Cited

U.S. PATENT DOCUMENTS

| | | | |
|---|---|---|---|
| 3,678,212 | 7/1972 | Wild | 360/2 |
| 3,893,182 | 7/1975 | Schmidt . | |
| 3,940,796 | 2/1976 | Haun et al. . | |
| 3,976,858 | 8/1976 | Haun . | |
| 3,995,256 | 11/1976 | Taniguchi | 360/2 |
| 4,028,734 | 6/1977 | Mos . | |
| 4,040,097 | 8/1977 | Mizuno . | |
| 4,040,108 | 8/1977 | Nakata . | |
| 4,057,011 | 11/1977 | Tramposch et al. . | |
| 4,193,099 | 3/1980 | Hayashi | 360/2 |
| 4,239,151 | 12/1980 | Enser et al. | 360/2 |
| 4,259,699 | 3/1981 | Yoshida . | |
| 4,304,992 | 12/1981 | Kobayashi et al. . | |
| 4,476,507 | 10/1984 | Koike . | |
| 4,518,853 | 5/1985 | Gabel . | |
| 4,585,929 | 4/1986 | Brown et al. . | |
| 4,593,328 | 6/1986 | Baus, Jr. | 360/2 |
| 4,598,479 | 7/1986 | Baus | 360/2 |
| 4,616,128 | 10/1986 | Case . | |
| 4,626,670 | 12/1986 | Miller . | |
| 4,692,602 | 9/1987 | Conant . | |
| 4,742,213 | 5/1988 | Conant . | |
| 4,800,258 | 1/1989 | Suzuki | 235/479 |
| 4,825,059 | 4/1989 | Kurihara | 235/485 |
| 4,843,221 | 6/1989 | Ohtsuki | 235/441 |

Primary Examiner—Harold Pitts
Attorney, Agent, or Firm—Merchant, Gould, Smith, Edell, Welter & Schmidt

[57] ABSTRACT

An encoding apparatus (20) encodes or reads information on a magnetic stripe on a card (50). The encoding apparatus (20) advances the card (50) along a card transport path defined by a frame (24), side support members (42 and 44), and top guide member (46). The card (50) advances by reversible drive means (26) having a single drive roller (28). Encoding is accomplished by an encoding head (36) in communication with an encoder (22) coupled to an idler roller (34) for encoding by position.

16 Claims, 4 Drawing Sheets

MAGNETIC ENCODING DEVICE FOR CARDS

This is a continuation of Ser. No. 312,738 filed Feb. 17, 1989, abandoned.

BACKGROUND OF THE INVENTION

The present invention relates to a magnetic encoding apparatus for encoding and reading information on a magnetic stripe of a plastic card such as a credit card, an automatic teller machine card, or other sheet material such as fare tickets or passbooks. Magnetic stripe encoding is typically performed along with other card processing operations such as embossing for graphics applications.

Magnetic encoded stripes are widely used on credit cards and other cards. Mechanisms for recording information onto the magnetic stripes are well known in the field. Such a mechanism is disclosed in U.S. Pat. No. 4,518,853 to Gabel et al. The Gabel et al. patent discloses an encoding apparatus for transporting a card from one end of an encoding apparatus and out the other end, but is not well suited for receiving and delivering a card from the same end and is relatively large and expensive.

Reading apparatus which are compact and low cost are also well known in the field. Such an apparatus is disclosed in U.S. Pat. No. 4,476,507 to Koike et al. The Koike patent uses a plurality of roller pairs and associated drive belts which limit head mounting locations. The Koike patent also uses a fixed lower guide, decreasing the card positioning reliability.

Mechanisms for encoding or reading information and receiving and delivering a card from the same end are also known in the field. Such a device is the Sanak Model MCT375-3A0130 from Sankyo Manufacturing. The Sankyo encoding device uses three rollers which are not spaced about the same center line and requires constant card velocity (encode by velocity) for accurate encoding and does not allow for encoding by position. The drive belts and roller mounting of the device limit the positioning and number of encoding heads.

SRD Neuron Model MTM2903-3R-0101 is an encoding apparatus receiving and delivering cards from the same end. The SRD encoder includes three rollers and two drive belts. The encoder includes angled rollers which will bias the card sideways. This will greatly increase wear on the rollers as the rollers are constantly slipping on the card. The encoding apparatus includes a fixed head which is used for encoding by velocity and has no direct tie to the position of the card, thereby increasing chances of encoding error.

A Sanwa Model CRA-2000B is an encoding apparatus receiving and delivering cards from the same end. The encoding apparatus uses three rollers and two drive belts and encodes by velocity. The Sanwa encoding apparatus does not include resilient side members biasing the card, allowing the card to move sideways along the card transport path increasing the probability of misalignment and encoding errors.

It is important that the card is correctly aligned so that contact is maintained between the magnetic stripe and the encoding head in the correct position. Prior alignment methods have not adequately addressed the problem of properly aligning and biasing the card during contact with the encoding head. Multiple pairs of drive rollers found in prior devices will also engage the card during encoding and reading leading to increased errors.

The prior encoding apparatus have not adequately solved the problem of having a small encoding device which receives and delivers cards from the same end, is low cost and reliable, allows many configurations for mounting encoding heads, and encodes accurately. Prior devices have included a number of the rollers and drive belts for advancing the card. The small rollers have axles extending across the transport path limiting the mounting positions for encoding heads, thereby limiting flexibility in adapting to different magnetic stripe requirements.

It is evident that a small, reliable, and accurate encoding apparatus is required which is durable and low cost. The present invention solves these and other problems associated with mechanisms for encoding magnetic stripes.

SUMMARY OF THE INVENTION

The present invention relates to an encoding apparatus for encoding or reading information on a magnetic stripe on a plastic card. More particularly, the present invention receives and delivers cards from a same end for returning to a user, such as in an automatic teller machine. According to the present invention, cards are manually inserted into a slot defining a first end of a card transport path. The card is inserted until engaged by card driving means. Card driving means comprise a drive roller opposing an idler roller. The card is positioned so that the magnetic stripe on the card passes an encoding head mounted along the card transport path. Side support members maintain even pressure against the edge of the card so that the card is properly positioned at all times. Encoding means coupled to the idler roller will encode only when the idler roller is rotated so that encoding by position is achieved. The encoding means writes or reads along the card magnetic stripe as the card is pinched between the idler roller and drive roller.

When the card has passed completely beyond the encoding head, the card engages a stop at a second end of the card transport path. The direction of the drive roller is then reversed so that the card may be read as the card is fed back out through the slot. If upon reading of the magnetic stripe, a problem or error is detected, the card can be refed by changing the feed direction of the drive roller and the card can be re-encoded or re-read.

The drive roller is driven by a small motor having a motor shaft engaging the periphery of the roller. A single drive roller is advantageous for minimizing the number of parts and allowing greater head mounting configuration. The drive roller is a relatively large rubber roller which provides both driving contact and resilience for maintaining contact against the card so that no additional springs are required. The encoding means is in communication with the idler roller so that encoding by position is achieved. In this manner, if the card slows, encoding is still accurately placed on the card. Multiple densities of encoded information may be accurately placed on the magnetic stripe of the card by sizing the diameter of the idler roller in conformance with the resolution of a relatively low cost encoding apparatus. It will be appreciated that encoding by velocity would also be provided for with this device.

According to the present invention, a drive roller shaft does not extend entirely across the card transport path and the drive shaft of the motor engages the periphery of the drive roller a distance from the card transport path, so that greater head mounting diversity is allowed. Alternatively, the drive roller may be mounted directly to the drive shaft of the motor. In this manner encoding heads and mounting springs may be mounted opposing one another for reading stripes on opposite sides of the card or more than one head may be mounted on a side for reading two or more magnetic stripes on a side of the card.

A photocell may be used for detecting the leading edge of the card so that encoding begins at the proper position. If a photocell is not used, the idler roller does not contact the drive roller but contacts the card upon insertion into the encoding apparatus. Encoding begins when the idler roller engages the card.

The side support members are resiliently biased against an edge of the card upon insertion into the card transport path. Side members are mounted along one edge of the transport path about the encoding position so that as the edge of the card passes an edge of the first side support member, the card engages the second side support member before the card may misalign. As the card continues along the transport path, the card is supported to a greater extent by the second side support member so that the card continues to be properly aligned. This is advantageous over a rigid support wherein no flexure is allowed for card irregularities. Likewise, the dual support system closely mounted together provides greater alignment than a single support wherein the card becomes supported only at a single point as the card approaches the end of the support.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings wherein like reference numerals and letters indicate corresponding elements throughout the several views.

DETAILED DESCRIPTION OF A PREFERRED EMBODIMENT

Figure 1:
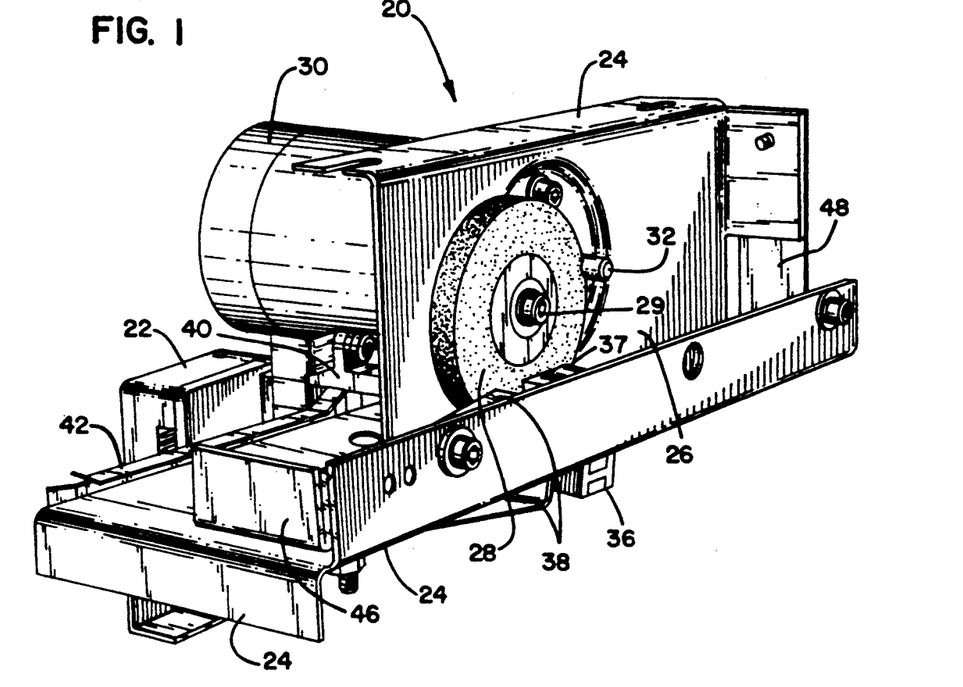
FIG. 1 is a perspective view of a preferred embodiment of a magnetic encoding apparatus according to the principles of the present invention.

In FIG. 1 is shown a perspective view of an encoding apparatus 20. The encoding apparatus 20 defines a card transport path wherein cards are received, then encoded or read and returned through the same opening. The encoding apparatus 20 includes encoder 22 supported by a frame 24 defining the base of the card transport path. A card is inserted into a card slot formed by the frame 24, a top member 46 and a first side support member 42. Upon insertion, a card is engaged by feeding means 26 and advanced for encoding or reading and fed back out through the slot formed by the top member 46 and the frame 24.

The feeding means 26 comprise a motor 30 having a shaft 32 protruding therefrom. The shaft 32 engages the drive roller 28 about its periphery. The drive roller 28 comprises a rubber roller, in a preferred embodiment the drive roller 28 has a diameter of about 3.75 cm. In this manner, the shaft 32 can engage the drive roller 28 without slippage and with a minimum of wear. The single drive roller 28 provides for greater freedom in encoding head positioning and provides for a plurality cf encoding heads to be mounted. The motor shaft 32 engaging the periphery of the drive roller 28 eliminates roller axles extending across the card transport path, thereby limiting encoding head configuration. The drive roller 28 also allows axle 29 for the drive roller 28 to be away from the card transport path so that neither the motor 30 nor the axle 29 of the drive roller 28 interfere with encoding head mounting.

Figure 2:
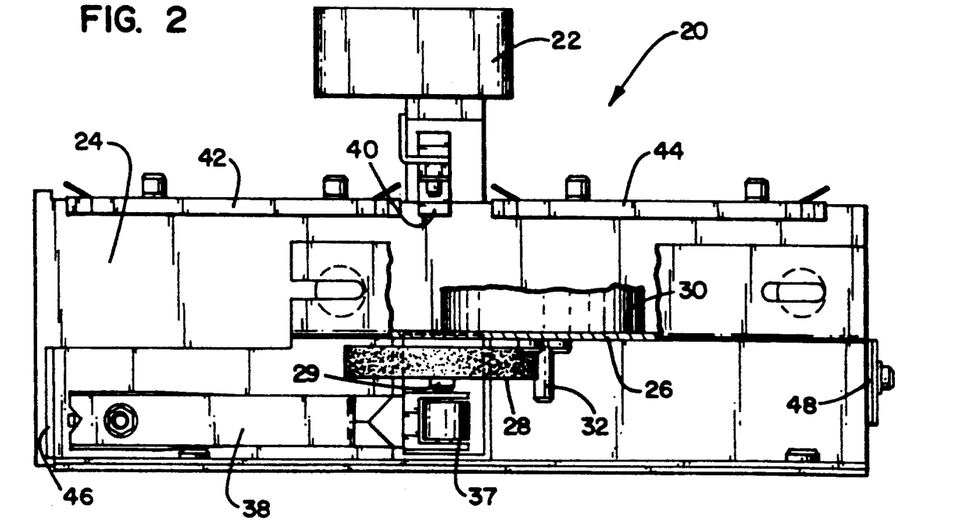
FIG. 2 is a top view of the encoding apparatus shown in FIG. 1 with part of the frame and motor removed.

As shown in FIG. 2, the card transport path extends along the frame 24 from the inlet slot at top member 46 and extends along the framework to an end stop 48. The single large drive roller 28 provides for mounting of an encoding head 36 and spring 38 next to the drive roller 28. A photocell 40 opposite the encoding head 36 detects the presence of a card for encoding positioning. However, as will be explained hereinafter, the photocell 40 may be removed and the encoding head 36 and spring 38 may be moved for encoding on either side of the drive roller 28.

Figures 3A, 3B, 4:
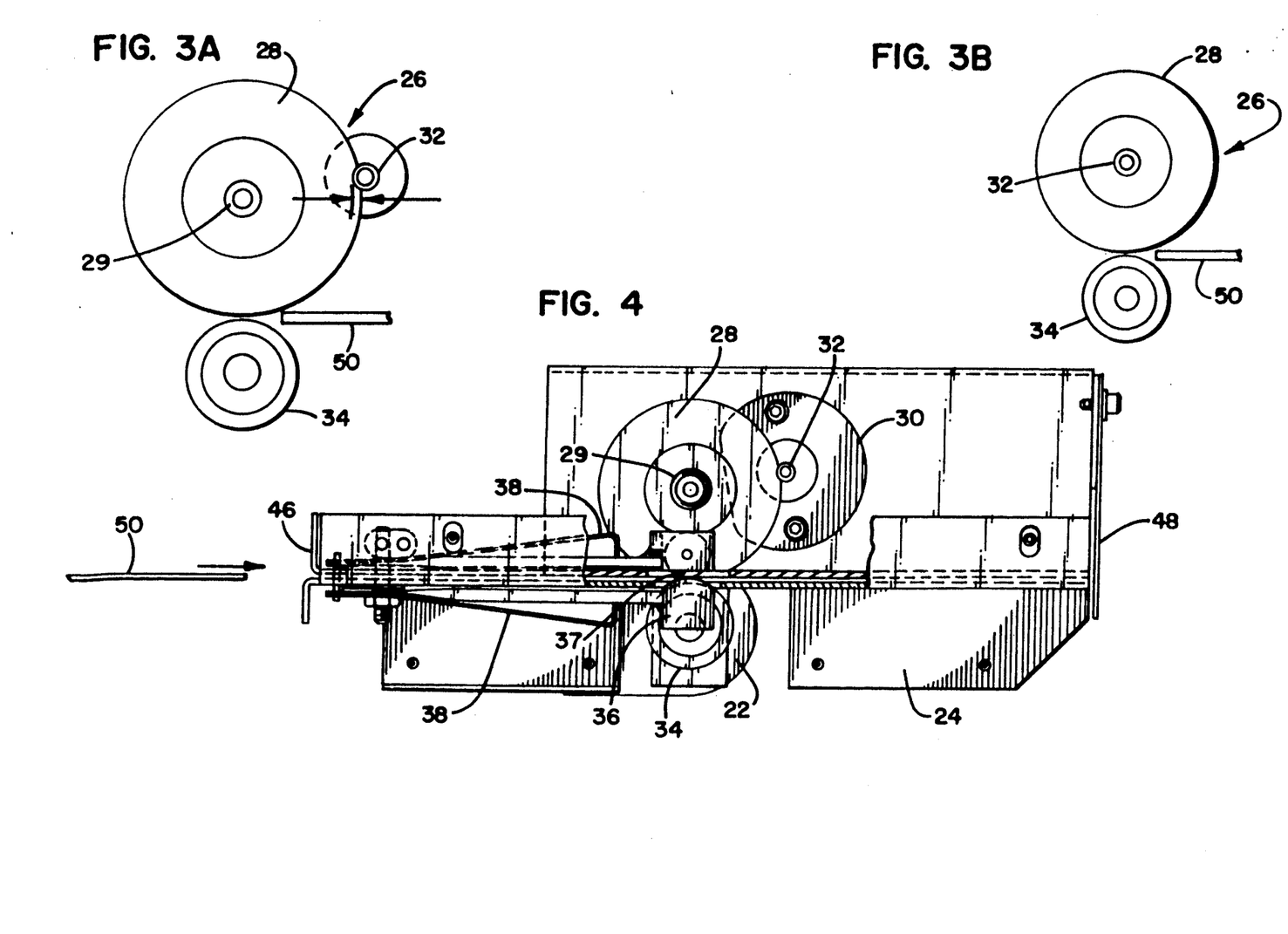
FIG. 3A is a side view of the card feeding mean of the encoding apparatus shown in FIG. 1.
FIG. 3B is a side view of an alternate embodiment of the card feeding means according to the principles of the present invention.
FIG. 4 is a side view of the encoding apparatus shown in FIG. 1 with a portion of the frame removed.

As shown in FIGS. 3A and 3B, the drive roller 28 has an idler roller 34 mounted below the drive roller 28. The drive roller 28 and the idler roller 34 may or may not be in contact with one another. When the card 50 is inserted, the idler roller 34 forces the card 50 into contact with the drive roller 28 for advancing the card 50.

It an alternate embodiment, the drive roller 28 is mounted directly to the motor shaft 32, as shown in FIG. 3B.

It can be appreciated that a the card 50 is advanced by the drive roller 28, the idler roller 34 is rotated by the card 50. As shown in FIG. 4, this becomes important as the encoder 22 is directly coupled to the idler roller 34. The encoder 22 only encodes when the card is advancing so that the idler roller 34 rotates, providing for encoding by position. Even if the drive roller 28 slips with respect to the card 50, the idler roller 34 rotates only if the card 50 is advanced so that encoding is still accurately placed. It can be appreciated that because the encoder 22 is linked to the idler roller 34, the photocell 40 is not required, as detection of the presence of the card 50 can be done by the idler roller 34 rotating with the movement of the card 50. In this case the idler roller 34 does not contact the drive roller 28.

As shown in FIG. 4, the encoding head 36 may be mounted above or below the card transport path for encoding on a stripe of the card 50. The encoding head 36 may be mounted on either side of the card transport path depending on the configuration of the stripes on the card 50. It can also be appreciated that with the configuration of the encoding apparatus 20, the encoding heads 36 may be mounted on both sides of the card transport path for encoding on opposing stripes on the card 50 if an encoding head 36 is required on only one side of the card 50, an opposing roller 37 may be added to maintain contact with the card. The freedom in encoding head 36 mounting enables the encoding apparatus 20 to be easily changed to accommodate a variety of stripe configurations on the card 50. It can be appreciated that the drive roller 28 contacts the card 50 at a single location along the card transport path and allows for reversibility of the drive roller 28 for delivering the card 50 in either direction along the card transport path.

As shown in FIGS. 1, 2 and 4, the top member 46 limits the thickness of the card 50 that can be inserted into the card transport path The top member 46 extends only a portion of the way across the card transport path so that embossed letters are not inserted under the top member 46. This insures that the card 50 will be inserted into the slot in the correct position.

Figure 5:
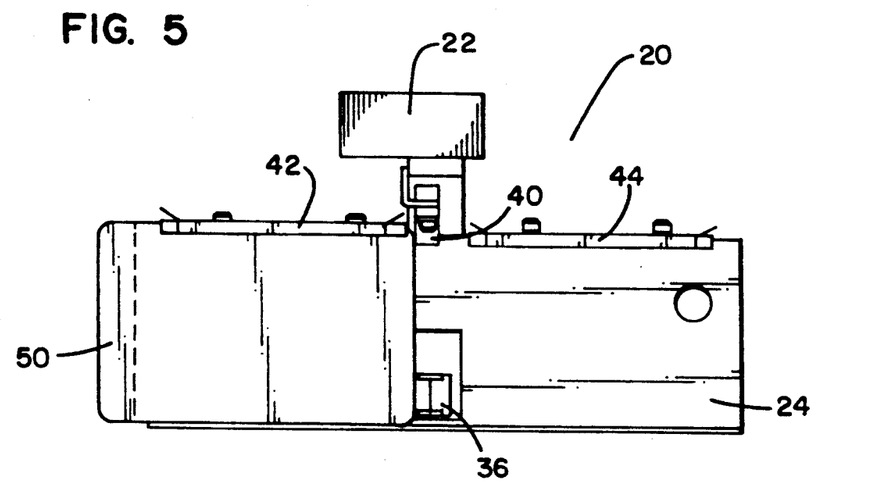
FIG. 5 is a top view of the card transport path of the encoding apparatus shown in FIG. 1, with a card inserted at the entrance of the card transport path and held by a side member.
Figure 6:
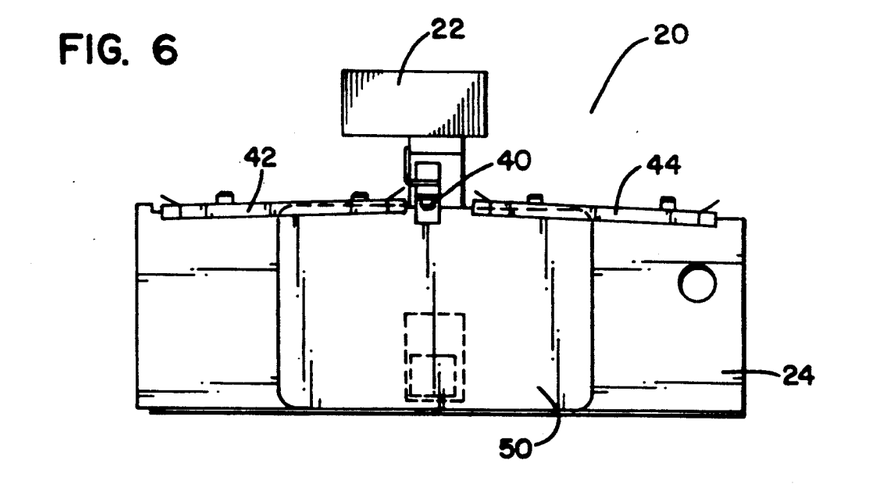
FIG. 6 is a top view of the card transport path shown in FIG. 5 with the card in an intermediate position held by two side members.

As shown in FIGS. 5 and 6, the card transport path is defined at one side by first and second side members 42 and 44. As shown in FIG. 1, the first side member 42 provides support against an edge of the card 50 and also holds the edge of the card 50 downward flat against the frame 24 for insuring proper alignment of the card 50 against the edge of the frame 24. As can be seen in FIG. 5, upon insertion of the card 50 the first side member 42 is pushed back away from the card transport path as shown in FIG. 5. In this manner, the first side member 42 provides even pressure on the side of the card 50 so that the card 50 is properly positioned for encoding. The pressure is placed equally along the entire side of the card 50 and is not at a single point so that the card 50 does not pivot out of alignment. Upon advancement of the card 50, the card is supported somewhat less by the first side member 42. However, before the side support of the first side member 42 is lessened to a great degree which may allow misalignment of the card 50, the card 50 engages the second side member 44 and is supported by both side members 42 and 44.

As shown in FIG. 6, as the card 50 is further advanced, the card 50 remains supported by both side members 42 and 44 at each corner of the card 50, thereby maintaining contact against the frame 24. As the card 50 is further advanced along the path, the edge becomes supported by the second side member 44 in the same manner that the card 50 is supported by the first side member 42. The card 50 engages the end stop 48 and is returned for exiting along the card transport path by the drive roller 28 and supported by side members 42 and 44. This arrangement provides substantial support along the edge of the card 50 and allows for card irregularities. This support and flexure is not provided in encoding apparatuses in which the sides are defined only by a frame and not by resilient side members. A single side member does not provide adequate support as a card deflects the support at the member end and there is not a second support member to align the card.

In the preferred embodiment, the end stop 48 is a resilient member used to return the card 50 to the drive roller 28. In an alternate embodiment, the end stop 48 may be a rigid member which does not allow the card 50 to leave contact with the drive roller 28. In yet another embodiment, the end stop 48 may be removed to allow the card 50 to pass out the opposite end at the card transport path.

Figure 7:
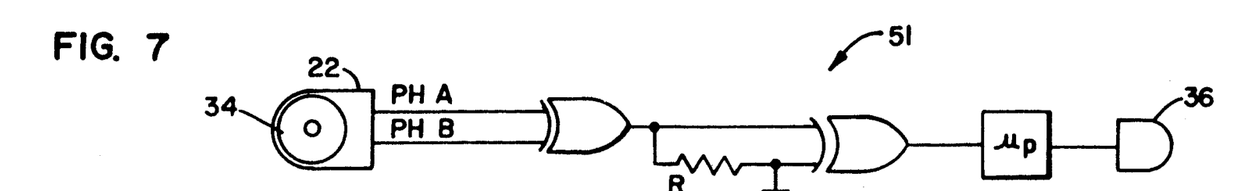
FIG. 7 is a diagrammatic view of an encoding density control circuit.
Figure 8:
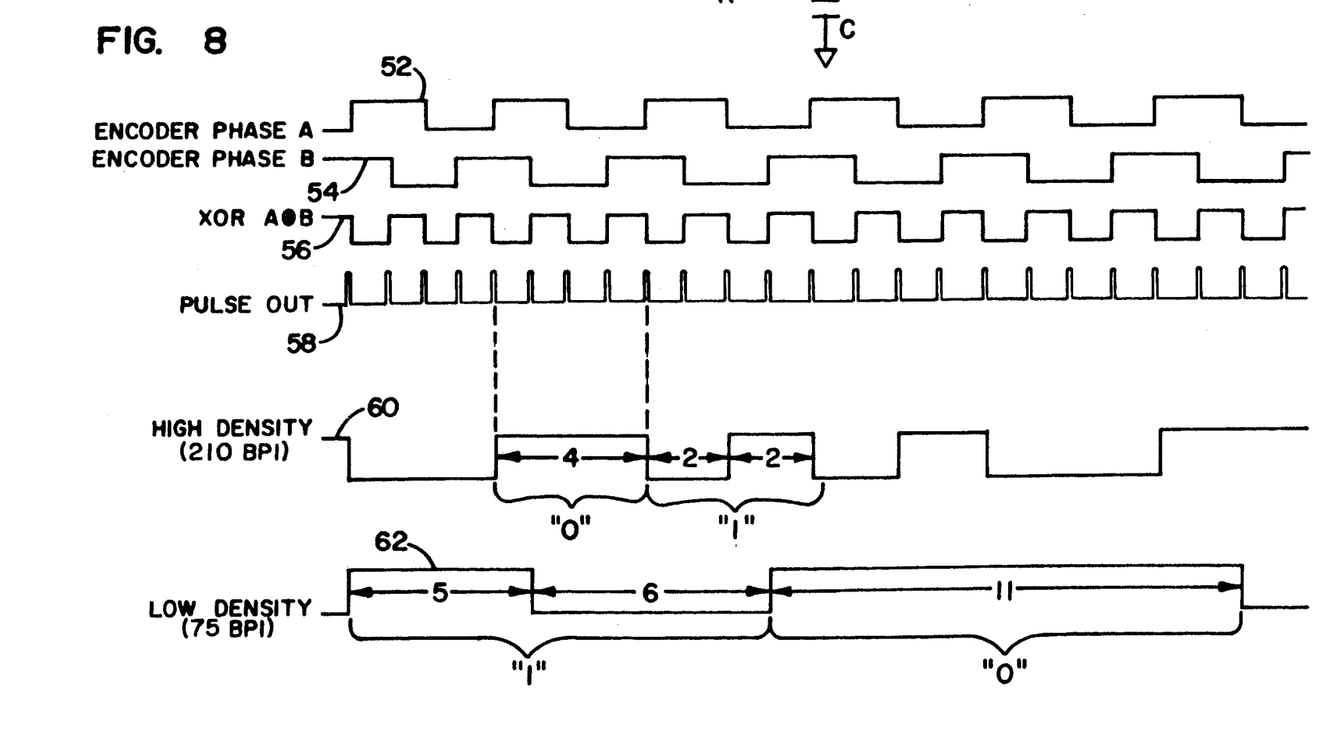
FIG. 8 is a series of waveforms illustrating the signals which appear in the circuit shown in FIG. 7.

FIGS. 7 and 8 show how two widely used information densities are accurately recorded onto the magnetic stripe of the card 50. The circuitry 51 converts a phase A waveform 52 and phase B waveform 54 from the encoder 22 into a pulse train 58 which is used as a card position reference for recording information onto the card 50. For example, in the low density waveform 62, a "1" consists of a first portion with a length equal to 5 pulses of pulse train 58 and a second portion with a length equal to 6 pulses of pulse train 58. High density 60 and low density 62 waveforms are then used to control the encoding head 36 which records the information onto the card 50. By proper sizing of the idler roller 34 in cooperation with the pulse train 58 from the circuitry 51, both densities 60,62 will be accurate to within 1%. In an alternate embodiment wherein encoding is by velocity, the pulse train 58 is used as a feedback reference with which to control the speed of the drive roller 28 resulting in a relatively constant velocity of the card 50. The waveform to control the head 36 is at a constant frequency matched to the intended velocity of the card 50.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An encoding and reading apparatus for encoding and reading information on a magnetic stripe of a card, comprising:

supporting framework defining a card transport path;

card retaining and positioning means located along one side of the card transport path for providing even pressure along an edge of the card for aligning the card as the card is transported past the card retaining and positioning means, wherein the card retaining and positioning means comprises first and second resilient rail members mounted on the framework, each member having a rail portion extending parallel to the card transport path;

card driving means rotatably contacting a face of the card at a single point along the card transport path for advancing the card into and out of the apparatus and having an opposing idler roller contacting an opposite face of a card; and encoding means proximate the card driving means comprising an encoder and encoding head in communication with an idler roller, the idler roller engaging the surface of the card, providing for encoding by position.

2. An apparatus according to claim 1, wherein the driving means comprises a single drive roller wherein the drive roller is a rubber roller engaging the card, and the idler roller opposing the drive roller is spaced apart from the drive roller such that upon insertion of a card between the drive roller and the idler roller, the card is pressed between the rollers such that the idler roller rotates as the card passes between the drive roller and the idler roller.

3. An apparatus according to claim 1, wherein the encoder is directly driven by the idler roller, so that the encoder rotates with the idler roller.

4. An apparatus according to claim 1, wherein the card driving means further comprises biasing means maintaining the card in contact with the card driving means.

5. An apparatus according to claim 1, wherein the encoding head is mountable on either side of the card transport path at a point along the transport path proximate the card driving means.

6. An apparatus according to claim 1, wherein the encoding means comprises a plurality of encoding heads mounted corresponding to a plurality of magnetic stripes on a card, wherein the heads are mounted proximate the card driving means.

7. An apparatus according to claim 1, wherein the card driving means comprises an elastic rubber roller.

8. An apparatus according to claim 1, further comprising card stopping means at an end of the card transport path opposite a card entrance end.

9. An apparatus according to claim 1, wherein the card driving means comprises an elastic rubber roller having a diameter of at least 3.75 cm.

10. An encoding apparatus according to claim 1, further comprising:
   encoding head tensioning means biasing the encoding head against the magnetic stripe;
   sensing means for detecting the presence of a card in the card transport path proximate the encoding means; and
   a first biasing member and a second biasing member equally spaced about the encoding position, providing equal tension along a portion of the edge of the card on both sides of the encoding position so that the edge of the card is not supported at a single point during encoding.

11. An apparatus according to claim 1, wherein the diameter of the idler roller is sized in accordance with the resolution of the encoding means for encoding a plurality of encoding densities.

12. An alignment device for use with a magnetic stripe encoding and reading apparatus, having a first side comprising a stationary first resilient side rail member extending along the first side of a card transport path and a stationary second resilient side rail member extending along the card transport path equally and oppositely spaced about encoding means, the first and second side members having means for resiliently maintaining the card flat along the card transport path, the first resilient side member engaging an edge of the card, on a first side of the stripe encoding position, the first side member extending to a point along the card transport path just short of the stripe encoding position, the second side member extending from a point just beyond the stripe encoding position along the card transport path, so that as the leading edge of the card passes the encoding position, the side of the card is supported by the first side member along a substantial portion of the edge of the card, and then as the card is transported further, the card is supported by the first and second side members, and then the card is supported by the second side member along a substantial portion of the edge of the card after a trailing edge of the card passes just beyond the encoding position.

13. An encoding and reading apparatus for use with cards having a magnetic stripe, inputting and delivering cards from the apparatus through a card slot, comprising:
   a framework defining a card transport path;
   card feeding means engaging a card at a single point along the card transport path so that upon insertion into the card transport path, the card feeding means passes the card over an encoding head and returns the card past the encoding head and delivers the card through the slot;
   card stopping means at an end of the card transport path opposite the card slot, preventing the card from disengaging the card feeding means;
   side positioning means, resiliently biasing the card so that the magnetic stripe passes over the encoding head correctly aligned, wherein the side positioning means comprises first and second resilient members extending along a first edge of the card transport path, wherein each side member extends along a substantial portion of the edge of the card so that the card is supported along its edge, and wherein the first and second members are spaced equally about the card feeding means, wherein reach resilient member has a rail portion extending along the card transport path, the first member positioned along the transport path intermediate the insertion point and the card feeding means, the second member positioned along the card transport path intermediate the card feeding means and the card stopping means; so that the card is continually supported along a substantial portion of its edge by a resilient member or supported at its corners by both resilient members during encoding;
   encoding means in communication with an idler roller engaging the card at the encoding means, the idler roller engaging a face of the card having the magnetic stripe so that if the card does not advance, the idler roller and the encoder do not rotate, thereby providing for encoding by position, wherein the encoding means is positioned at a point along the card transport path substantially even with the card feeding means; and
   reversible drive means directly driving the card feeding means for inputting cards and delivering cards from the encoding apparatus along the card transport path.

14. An encoding apparatus according to claim 13, wherein the card slot comprises a top member extending partially across a card for preventing embossed letters from being input into the slot beneath the top member.

15. A method for encoding a plurality of densities of information onto magnetic strip of a card with an encoding apparatus having an idler roller in rotating contact with the card, the diameter of the idler roller sized in conformance with the resolution of encoding means, the idler roller coupled to the encoding means, comprising the steps of:
   passing electric pulses from the encoding means through circuit means to obtain an output waveform having pulses corresponding to the densities of information;

counting the pulses of the output waveform to obtain a recording density corresponding to a first density;

counting the pulses at the output waveform to obtain a recording density to a second density; and encoding the information at the corresponding magnetic densities at a position proximate the idler roller; wherein the encoding is by position, encoding as the idler roller rotates with the card, and wherein the card is supported by resilient side rail members while encoded.

16. An encoding and reading apparatus according to claim 13, wherein the encoding means is intermediate the first and second resilient members, so that even pressure along the edge of the card is maintained during encoding.

* * * * *

UNITED STATES PATENT AND TRADEMARK OFFICE
CERTIFICATE OF CORRECTION

PATENT NO.   :   5,206,489
DATED        :   April 27, 1993
INVENTOR(S)  :   D. Warwick It is certified that error appears in the above-identified patent and that said Letters Patent is hereby corrected as shown below:

Column 3, Line 55, DELETE "mean" and INSERT therefor --means--

Column 4, Line 58, DELETE --a-- and INSERT therefor --as--

Column 8, Line 30, DELETE "reach" and INSERT therefor --each--

Column 8, Line 59, DELETE "onto" and INSERT therefor --onto a--

Signed and Sealed this

Twenty-ninth Day of March, 1994

Attest:

BRUCE LEHMAN

*Attesting Officer*  *Commissioner of Patents and Trademarks*